US012715269B2

(12) United States Patent
Lee et al.

(10) Patent No.: US 12,715,269 B2

(45) Date of Patent: Aug. 25, 2026

(54) AIR VENT STRUCTURE

(71) Applicants: HYUNDAI MOTOR COMPANY, Seoul (KR); KIA CORPORATION, Seoul (KR); (IUCF-HYU) Industry-University Cooperation Foundation Hanyang University, Seoul (KR)

(72) Inventors: Yoon Hyung Lee, Seongnam-si (KR); Yong Chul Kim, Hwaseong-si (KR); Seong Min An, Seoul (KR); Se Jin Yook, Seoul (KR); Su Hoon Park, Seoul (KR)

(73) Assignees: Hyundai Motor Company, Seoul (KR); Kia Corporation, Seoul (KR); (IUCF-HYU) Industry-University Cooperation Foundation Hanyang University, Seoul (KR)

( * ) Notice: Subject to any disclaimer, the term of this patent is extended or adjusted under 35 U.S.C. 154(b) by 918 days.

(21) Appl. No.: 17/949,649

(22) Filed: Sep. 21, 2022

(65) Prior Publication Data

US 2023/0099242 A1 Mar. 30, 2023

(30) Foreign Application Priority Data

Sep. 30, 2021 (KR) ........................ 10-2021-0129661

(51) Int. Cl.
*B60H 1/34* (2006.01)

(52) U.S. Cl.
CPC .................................. *B60H 1/3414* (2013.01)

(58) Field of Classification Search
CPC .................... B60H 1/3414; B60H 1/34; B60H 2001/3492; F24F 2221/28
USPC .......................................................... 454/109
See application file for complete search history.

(56) References Cited

U.S. PATENT DOCUMENTS

| | | | | |
|---|---|---|---|---|
| 4,766,805 A * | 8/1988 | Sato | B60S 1/54 | 454/127 |
| 2005/0130579 A1* | 6/2005 | Butera | B60H 1/00564 | 454/121 |
| 2010/0026034 A1* | 2/2010 | Storgato | B60H 1/00028 | 296/70 |
| 2016/0039389 A1* | 2/2016 | Kato | B60H 1/3414 | 454/155 |

(Continued)

FOREIGN PATENT DOCUMENTS

| | | | |
|---|---|---|---|
| CN | 107206868 A * | 9/2017 | B60H 1/3414 |
| DE | 102010049110 A1 * | 6/2011 | B60H 1/3435 |

(Continued)

*Primary Examiner* — Michael G Hoang
*Assistant Examiner* — Frances F. Hamilton
(74) *Attorney, Agent, or Firm* — Morgan Lewis & Bockius LLP

(57) ABSTRACT

The present disclosure relates to an air vent structure and, more specifically, to a slim air vent structure provided in a vehicle interior and using a Coanda effect. The air vent structure includes a collection plate disposed on a first side in a passage through which air flows. An inclined surface is disposed on a second side that is opposite to the first side, and the inclined surface has an inclination. A projection is configured to be retractable from the inclined surface. A volume of the projection, protruding from the inclined surface, is adjustable.

14 Claims, 7 Drawing Sheets

(56) References Cited

U.S. PATENT DOCUMENTS

2016/0052368 A1* 2/2016 Zhang .................. B60H 1/3414
454/154
2016/0121696 A1* 5/2016 Yamamoto ......... B60H 1/00564
454/155
2016/0121697 A1* 5/2016 Yamamoto ............ F24F 13/081
454/155
2017/0253107 A1* 9/2017 Castiglioni .......... B60H 1/3414
2017/0276389 A1* 9/2017 Yamamoto ............... F24F 11/70
2017/0326938 A1* 11/2017 Motomura ................ B60S 1/54
2018/0079282 A1 3/2018 Hoerschler et al.
2019/0070936 A1* 3/2019 Otsuki ................... F24F 1/0011
2019/0315200 A1* 10/2019 Pestke .................. B60H 1/3421
2020/0063988 A1* 2/2020 Choi ..................... F24F 1/0025
2021/0131697 A1* 5/2021 Kim ........................ F24F 13/06
2021/0260968 A1 8/2021 Kim et al.
2022/0134847 A1* 5/2022 Lee .................... B60H 1/00564
454/155
2025/0010693 A1* 1/2025 Kim ..................... B60H 1/3414

FOREIGN PATENT DOCUMENTS

EP 2090449 A2 * 8/2009 ........... B60H 1/3414
JP S62117155 U * 7/1987
JP 2003276431 A * 9/2003 ........... B60H 1/3414
JP 2014-234117 A 12/2014
JP 2016185753 A * 10/2016
KR 10-2020-0076936 A 6/2020
KR 10-2021-0052959 A 5/2021
KR 10-2021-0060276 A 5/2021
KR 10-2021-0107370 A 9/2021

* cited by examiner

FIG. 1D
10
30
14
16
20
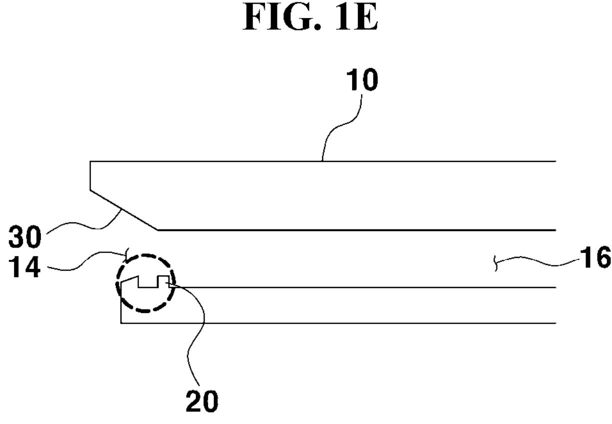
FIG. 1E
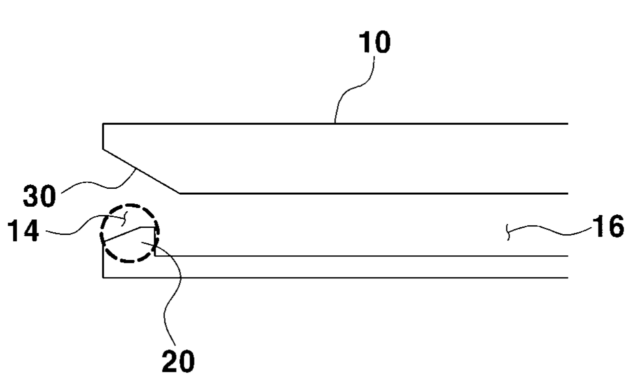
FIG. 1F

AIR VENT STRUCTURE

CROSS-REFERENCE TO RELATED APPLICATION

This application claims under 35 U.S.C. § 119(a) the benefit of priority to Korean Patent Application No. 10-2021-0129661, filed on Sep. 30, 2021, the entire contents of which are incorporated herein by reference.

TECHNICAL FIELD

The present disclosure relates to an air vent structure and, more specifically, to a slim air vent structure provided in a vehicle interior and using Coanda effect.

BACKGROUND

A vehicle interior is provided with a discharge port through which air is supplied from an air conditioning system of a vehicle. An air vent is mounted on the discharge port, and a plurality of wings are mounted on the air vent to vertically or horizontally adjust a wind direction of the air coming out of the discharge port.

The air vent not only promotes the air conditioning in the vehicle interior, but also has a great influence on the aesthetic sense of the interior. Recently, a slim or an ultra-slim air vent with a very small height of about 15 mm is attracting attention.

When the air vent has a plurality of wings as in the conventional one, it is difficult to build the ultra-slim air vent due to the size of the wings. Further, in the conventional type of the plurality of wings, the wing itself serves as a large flow resistance, resulting in a great loss in wind volume and an ineffective wind direction control.

Therefore, it is necessary to design an air vent structure enabling an ultra-slim design without using the wings and improving performance.

The above information disclosed in this Background section is only for enhancement of understanding of the background of the disclosure and accordingly it may include information that does not form the prior art that is already known in this country to a person of ordinary skill in the art.

SUMMARY OF THE DISCLOSURE

The present disclosure has been made in an effort to solve the above problem, and an object of the present disclosure is to provide an air vent structure capable of providing a slim air vent structure.

Another object of the present disclosure is to provide an air vent structure capable of improving the appearance of a vehicle interior.

The objects of the present disclosure are not limited to the aforementioned objects, and other objects not mentioned of the present disclosure can be clearly understood by those skilled in the art to which the present disclosure pertains (hereinafter referred to as 'those skilled in the art') from the following description.

The characteristics of the present disclosure for achieving the objects of the present disclosure and performing the characteristic function of the present disclosure to be described later are as follows.

According to an embodiment of the present disclosure, an air vent structure includes a collection plate disposed on a first side in a passage through which air flows; an inclined surface disposed on a second side that is opposite to the first side, the inclined surface having an inclination; and a projection configured to be retractable from the inclined surface. A volume of the projection, protruding from the inclined surface, is configured to be adjustable.

The present disclosure provides the air vent structure capable of providing the slim air vent structure.

The present disclosure provides the air vent structure capable of improving the appearance of the vehicle interior.

The effect of the present disclosure is not limited to the aforementioned effects, and other effects not mentioned can be clearly understood by those skilled in the art from the following description.

It is understood that the term "automotive" or "vehicular" or other similar term as used herein is inclusive of motor vehicles in general such as passenger automobiles including sports utility vehicles (operation SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The above and other features of the disclosure are discussed infra.

BRIEF DESCRIPTION OF THE DRAWINGS

The above and other features of the present disclosure will now be described in detail with reference to certain exemplary examples thereof illustrated in the accompanying drawings which are given herein below by way of illustration only, and thus are not limitative of the present disclosure, and wherein:

FIGS. 1B to 1G show a collection plate according to various exemplary embodiments of the present disclosure;

Figure 1A:
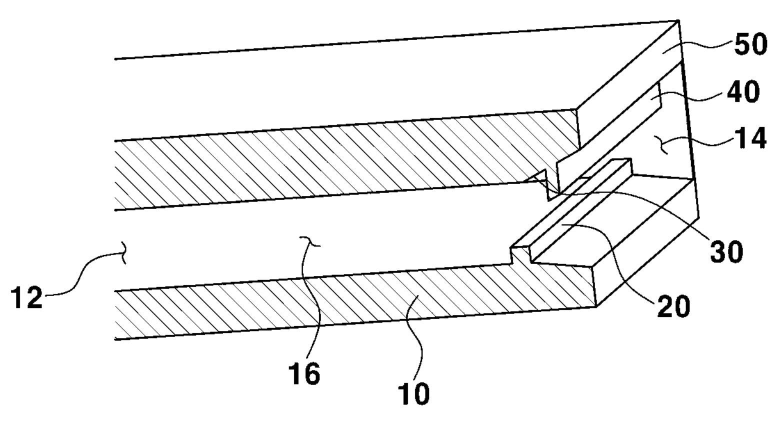
FIG. 1A shows an air vent structure according to some exemplary embodiments of the present disclosure.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in section by the particular intended application and use environment.

In the figures, reference numbers refer to the same or equivalent sections of the present disclosure throughout the several figures of the drawing.

DETAILED DESCRIPTION

Specific structural or functional descriptions presented in exemplary embodiments of the present disclosure are only exemplified for the purpose of describing the exemplary embodiments according to the concept of the present disclosure, and the exemplary embodiments according to the concept of the present disclosure may be carried out in various forms. Further, the exemplary embodiments should not be interpreted as being limited to the exemplary embodiments described in the present specification, and should be understood as including all modifications, equivalents, and substitutes included in the spirit and technical scope of the present disclosure.

Meanwhile, in the present disclosure, terms such as first and/or second may be used to describe various components, but the components are not limited to the terms. The terms are used only for the purpose of distinguishing one component from other components. For example, a first component may be referred to as a second component, and similarly, the second component may also be referred to as the first component, without departing from the scope according to the concept of the present disclosure.

When a component is referred to as being "connected" or "coupled" to another component, it should be understood that the components may be directly connected or coupled to each other, but still another component may also exist therebetween. On the other hand, when a component is referred to as being "directly connected to" or "in direct contact with" another component, it should be understood that another component does not exist therebetween. Other expressions for describing the relationship between components, that is, expressions such as "between" and "directly between" or "adjacent to" and "directly adjacent to" should be also interpreted in the same manner.

Throughout the specification, the same reference numerals refer to the same elements. Meanwhile, the terms used in the present specification are for the purpose of describing the exemplary embodiments and are not intended to limit the present disclosure. In the present specification, the singular form also includes the plural form unless otherwise specified in the phrase. "Comprises" and/or "comprising" used in the specification specifies the presence of the mentioned component, step, operation, and/or element, and does not exclude the presence or the addition of one or more other components, steps, operations, and/or elements.

The present disclosure relates to a wingless, slim air vent structure. According to the present invention, a wind direction may be adjusted using the Coanda effect without making use of wings.

In particular, according to the present disclosure, a collection plate is arranged at one side of an airflow passage, and an inclined surface is arranged on an opposite side of the collection plate. The wind direction may be adjusted by varying a protruded volume of a projection provided on the inclined surface.

Hereinafter, the present disclosure will be described in detail with reference to the accompanying drawings.

As shown in FIG. 1A, a slim air vent structure according to the present disclosure includes a passage 10, a collection plate 20, and an inclined surface 30.

A fluid, such as air, is configured to move through the passage 10. The passage 10 (e.g., a duct) includes an inlet 12 and an outlet 14. The fluid flows into the passage 10 through the inlet 12, and the fluid is discharged to an outside of the passage 10 through the outlet 14. According to an embodiment of the present disclosure, the inlet 12 communicates with an air conditioning system of a vehicle, and the outlet 14 communicates with a vehicle cabin.

Figure 2:
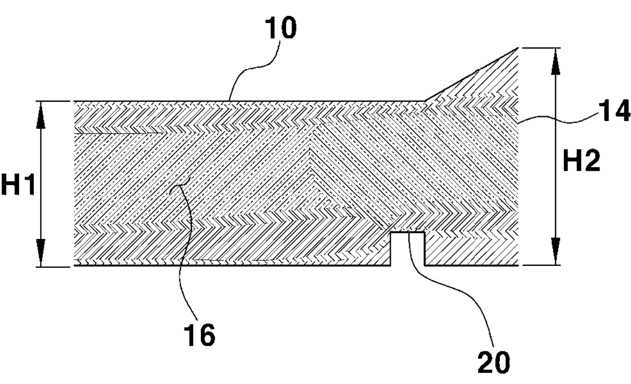
FIGS. 2 to 5 show cross sections of the air vent structure according to the present disclosure during the flow analysis.

Referring to FIG. 2, according to the present disclosure, a height (H1) of the passage 10 (e.g., at the inlet side) and/or a height (H2) of the outlet 14 are selected to optimize a wind direction control. In particular, according to the present disclosure, the height (H1) of the passage 10 is maintained as small as possible at the inlet side and is set within a range in which a ventilation resistance is not excessive. Preferably, the height (H1) of the passage 10 is 10 mm to 20 mm. According to some embodiments, the height (H1) of the passage 10 is set as about 10 mm. According to some embodiments, the height (H1) of the passage 10 is set as about 15 mm. When the height (H1) of the passage 10 increases, an airflow distribution expands and a Coanda force along the inclined surface 30 gradually weakens, which makes it difficult to control the wind direction with increasing height (H1) of the passage 10. The ventilation resistance tends to be excessively large at a height of less than 10 mm, while the Coanda effect weakens at a height of more than 20 mm.

The height (H2) of the outlet 14 may be arranged larger than the selected height (H1) of the passage 10 by a certain height. For example, the height (H2) of the outlet 14 may be about 5 mm larger than the height (H1) of the passage 10.

Referring back to FIG. 1A, the collection plate 20 and the inclined surface 30 are disposed in the passage 10. The collection plate 20 and the inclined surface 30 may be provided at positions substantially facing each other in the passage 10, respectively. As shown in the drawings, the collection plate 20 may be provided on a lower side of the passage 10 and the inclined surface 30 may be disposed on an upper side of the passage 10. Further, the opposite case may also be possible.

The collection plate 20 is designed to reduce a size of a flow path provided by the passage 10 or a cross-sectional height of the passage 10 compared to other portions of the passage 10. This is to collect the airflow to one side of the passage 10. According to an exemplary embodiment, the collection plate 20 may be a flat plate. In other words, the collection plate 20 may be provided on the lower side of the passage 10 to extend horizontally and extend in parallel on the lower side of the passage 10. However, the collection plate 20 may be any shapes, such as a curved surface, other than the flat plate, as long as the collection plate 20 has a shape capable of reducing the diameter of the passage 10 or the cross-sectional height of the passage 10.

Figure 1B:
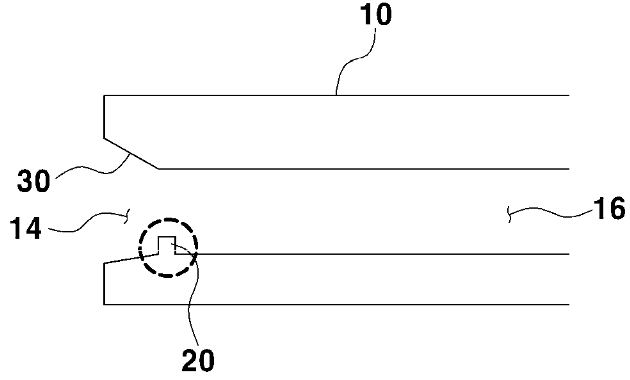
Figure 1C:
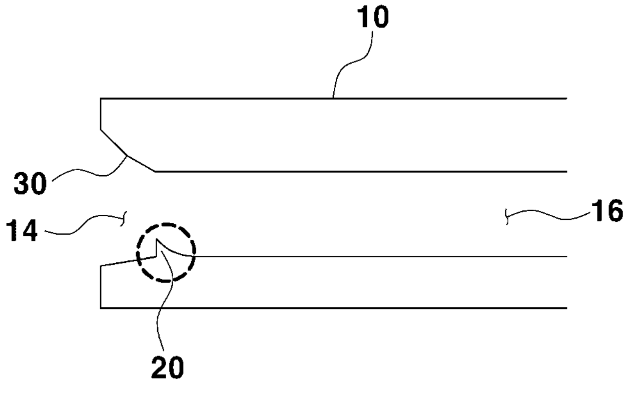
Figure 1G:
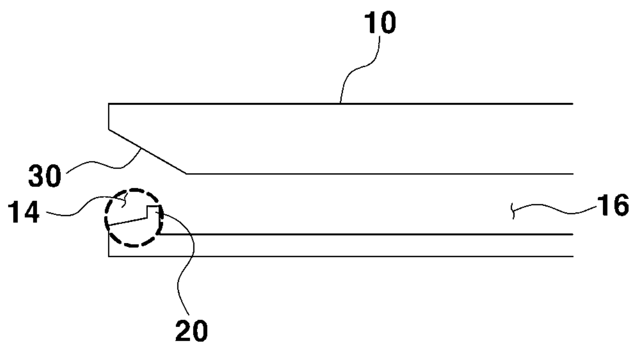

As shown FIGS. 1B to 1G, the collection plate 20 may be formed in various shapes capable of reducing the diameter of the passage 10 or the cross-sectional height of the passage 10. According to one embodiment, as shown in FIG. 1B, the collection plate 20 may be a rectangular solid provided to reduce the height of the passage 10. In one embodiment, as shown in FIG. 1C, the collection plate 20 may have a hill shape. In particular, a first inclination at a side of the collection plate 20, toward which the air approaches, is configured to be smoother than a second inclination at a side of the collection plate 20, from which the air leaves. A tip portion may be formed between the first and the second inclinations. In an embodiment, as shown in FIG. 1D, the collection plate 20 includes a hill portion. The tip portion may be flat, which is distinguishable from the tip portion of FIG. 1C. A channel 16 in the passage 10 may expand from the tip portion toward the outlet 14. As shown in FIG. 1E, the collection plate 20 can include two or more pillars. The collection plate 20 may also take the form in which a first pillar is provided at a side where the air approaches the collection plate 20 and a second pillar is provided at a position spaced apart from the first pillar toward the outlet 14 by a certain distance. Further, as shown in FIG. 1F, according to an embodiment, the collection plate 20 can also have a combination of the rectangular solid and the hill portion. A vertical inclination is formed at the side where the air approaches the collection plate 20. The collection plate 20 further includes a flat portion on the end of the vertical inclination and the inclination inclined in a direction of expanding the outlet 14 again. As shown in FIG. 1G, in an embodiment, the collection plate 20 includes the square pillar and the hill portion as in FIG. 1F, but the hill portion of FIG. 1G is configured to begin at a discrete point lower than the square pillar.

The inclined surface 30 may have an upward inclination toward the outlet 14. In other words, the diameter or height of the passage 10 may gradually increase toward the outlet 14 side due to the inclined surface 30. According to some exemplary embodiments of the present disclosure, a profile of the inclined surface 30 can also be formed of a straight surface. In some embodiments, a preset curvature may be applied to the profile of the inclined surface 30. Unlike in the drawings, if the inclined surface 30 is provided on the lower side of the passage 10 and the collection plate 20 is provided on the upper side of the passage 10, the inclined surface 30 may have a downward inclination toward the outlet 14. In conclusion, the inclined surface 30 may have an inclination that increases the diameter of the passage 10 or the cross-sectional height of the passage 10. However, hereinafter, for the convenience of explanation and understanding, a structure of coinciding with the drawings will be described.

According to some exemplary embodiments of the present disclosure, at least one of a thickness (T) of the collection plate 20, a length (L) of the collection plate 20, and a position (P) of the collection plate 20 may be determined.

Figure 3:
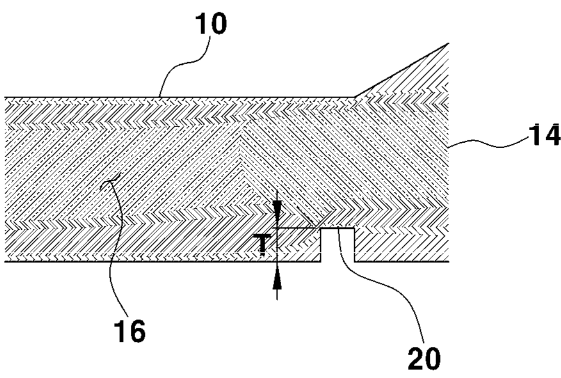

According to the present disclosure with reference to FIG. 3, the thickness (T) of the collection plate 20 is determined in consideration of the flow resistance and the Coanda effect. Since the air flowing in the passage 10 may not be collected in the inclined surface 30 without the presence of the collection plate 20, the Coanda effect in this case becomes insignificant, which may inhibit generation of the upward wind. Therefore, since the distribution of the wind is collected around the inclined surface 30 as the thickness (T) of the collection plate 20 increases, the Coanda effect increases and the upward wind may be better generated. However, if the thickness (T) of the collection plate 20 is set at a value greater than a certain limit, a cross-sectional area of the channel 16 is reduced. Then the flow resistance is increased. Accordingly, the thickness (T) of the collection plate 20 may be set to optimize the flow resistance and the Coanda effect. According to some embodiments of the present disclosure, the thickness (T) of the collection plate 20 is set as 10 to 50% of the height (H1) of the passage 10. When the thickness (T) of the collection plate 20 is less than 10% of the height (H1) of the passage 10, the Coanda effect greatly wanes, which hinders generation of the upward wind. On the other hand, when the thickness (T) of the collection plate 20 exceeds 50% of the height (H1) of the passage 10, the air resistance becomes strong. Therefore, according to the present disclosure, the thickness (T) of the collection plate 20 is set as 10 to 50% of the height (H1) of the passage 10.

Figure 4:
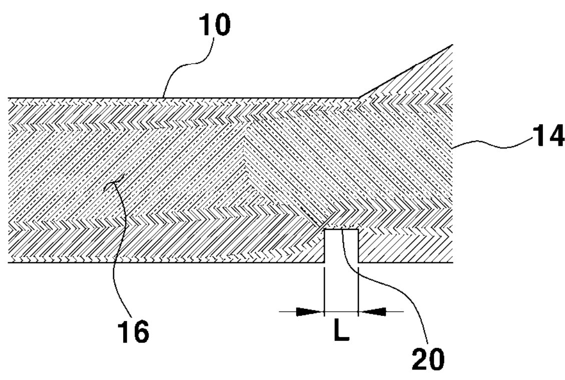

According to the present disclosure with reference to FIG. 4, the length (L) of the collection plate 20 is determined. The inventors of the present disclosure found during the flow analysis that the upward wind is better created as the length (L) of the collection plate 20 decreases. The smaller length may cause the wind to ride the inclined surface 30 as soon as it collides with the collection plate 20. According to the present disclosure, the length (L) of the collection plate 20 may be any value in the range of 1 to 30 mm. According to some embodiments, the length (L) of the collection plate 20 is about 2 mm. Even if the length (L) of the collection plate 20 is less than 1 mm, the upward wind may be formed and the length (L) may be set to a length that is easily designed depending upon the designer's determination. However, if the length (L) exceeds 30 mm, the Coanda effect may weaken, thereby reducing the wind direction adjustment performance.

Figure 5:
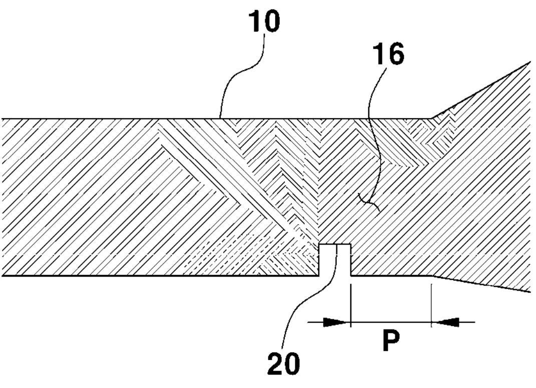

According to the present disclosure with reference to FIG. 5, the position (P) of the collection plate 20 may be selected. The inventors of the present disclosure found through the flow analysis that the closer the position of the collection plate 20 to the inclined surface 30, the stronger the wind riding the inclined surface 30, thereby facilitating creation of the upward wind. According to the present disclosure, creation of the upward wind can be facilitated by making meet an end point of the collection plate 20 with a start point of the inclined surface 30.

According to an embodiment of the present disclosure, a projection 40 being retractable may be arranged on the inclined surface 30, as shown in FIG. 1A. The projection 40 is provided in the passage 10 and may protrude toward the channel 16 in the passage 10. A protruded volume of the projection 40 may be adjusted. An operation of the retractable projection 40 may be implemented by various mechanisms.

Figure 6A:
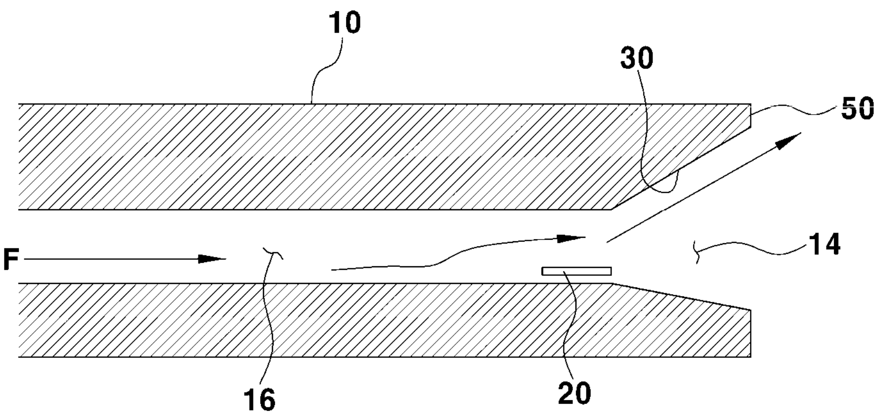
FIGS. 6A to 6C show a wind direction control changing with a protruded volume of a protrusion in the air vent structure according to the present disclosure.
Figure 6B:
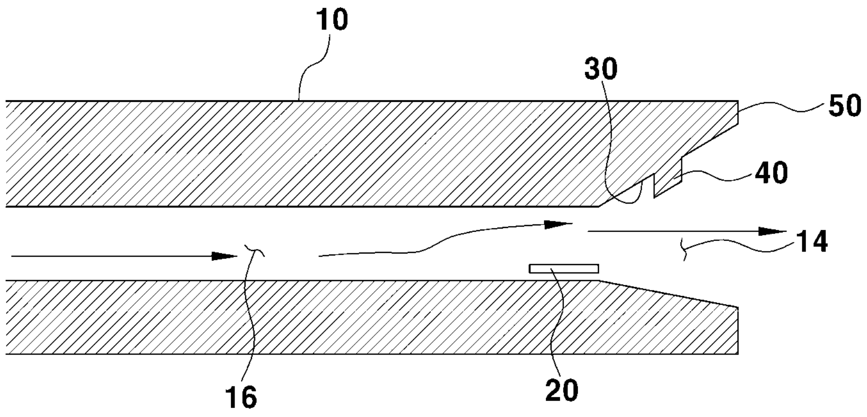
Figure 6C:
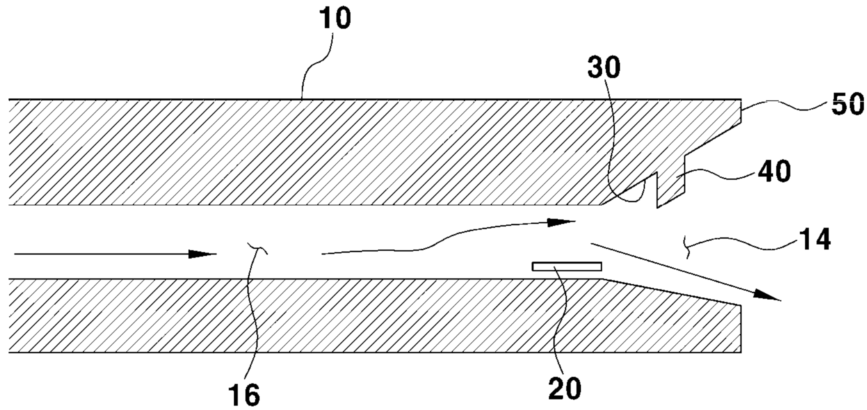

As shown in FIGS. 6A to 6C, the wind direction may be adjusted by adjusting the protruded volume of the projection 40. As shown in FIG. 6A, when the projection 40 does not protrude, the fluid flowing through the channel 16 of the passage 10 is discharged upward along an arrow (F). The air flowing in the passage 10 is collected on the opposite side of the collection plate 20 due to the influence of the collection plate 20. Further, the air collected on the opposite side of the collection plate 20 flows along the inclined surface 30. In this case, the Coanda effect can be maximized. As described above, when the projection 40 does not protrude, the air or the wind is discharged to the outside of the channel 16 upward along the inclined surface 30, thereby creating the upward wind.

As shown in FIG. 6B, when the projection 40 is adjusted to protrude by a certain amount, the fluid flowing through the channel 16 of the passage 10 moves straight along the arrow F and is discharged through the outlet 14. As the projection 40 protrudes, the Coanda effect gradually disappears to allow the wind to flow to the center of the channel 16, and a straight wind can be generated.

Further, as shown in FIG. 6C, when the protruded volume of the projection 40 is increased, the wind is directed downward. Therefore, as shown in the drawings, the flowing air is discharged to the outside of the channel 16 downward (F) and may create a downward wind. According to the present disclosure, the discharged wind direction may be adjusted by changing the protruded volume of the projection 40 even without wings.

Figure 7A:
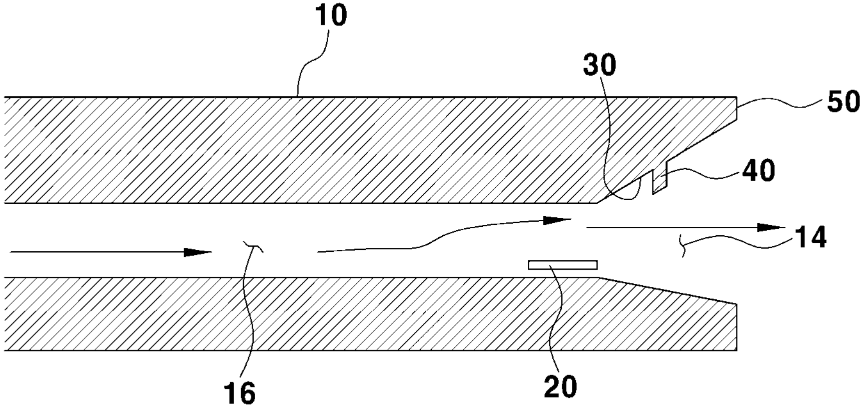
FIGS. 7A to 7C show tip shapes of the projection according to various exemplary embodiments of the present disclosure.
Figure 7B:
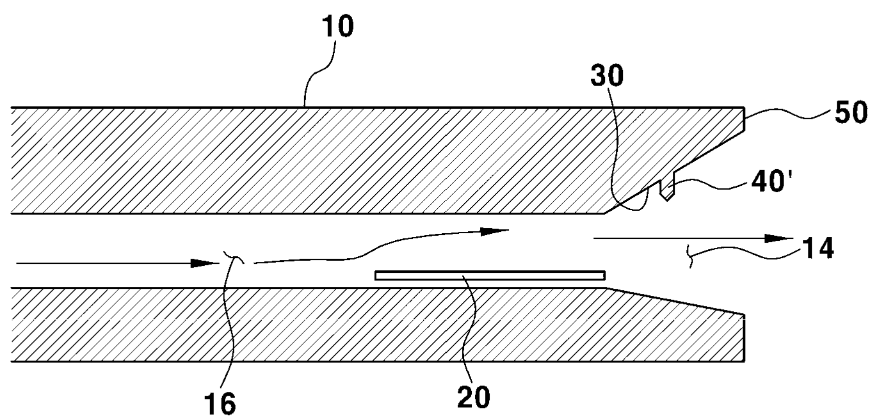
Figure 7C:
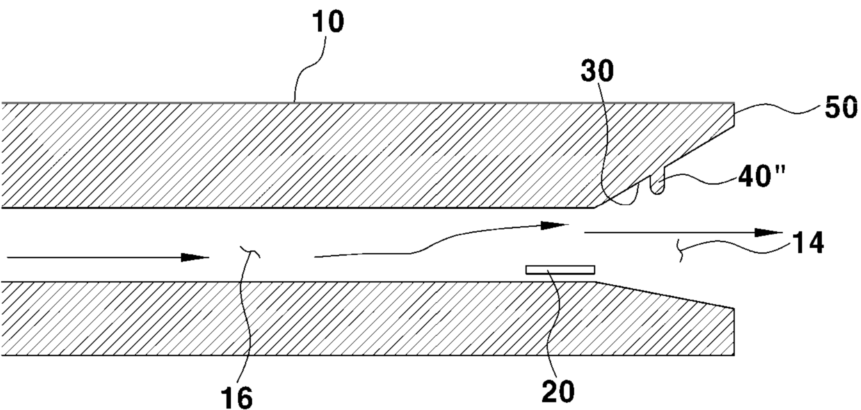

As shown in FIGS. 7A to 7C, a shape of the tip of the projection 40 may be determined. According to some embodiments, the projection 40 including an oblique tip is applied. In some embodiments, a projection 40' including a triangular tip is applied. In some embodiments, a projection 40" including a rounded tip may be applied.

The shape of the tip of the projection 40 may be selected to facilitate generation of the upward wind, i.e., to maximize the Coanda effect. At the same time, a shape that may best create the downward wind is selected when the projection 40 is protruded.

The inventors of the present disclosure found that the upward wind was best generated when the tip of the projection 40 had a shape that coincides with the inclined surface 30 upon forming the upward wind. Further, the inventors of the present disclosure confirmed that the downward wind was better formed when the projection 40 with the triangular tip or with the oblique tip was used.

Preferably, the slim air vent structure according to the present disclosure may include the projection 40 having the tip of the oblique shape. As shown in FIG. 7A, the oblique tip has an upward inclination toward the outlet 14. The inclination of the oblique tip is configured to coincide with the inclination of the inclined surface 30.

Figure 8:
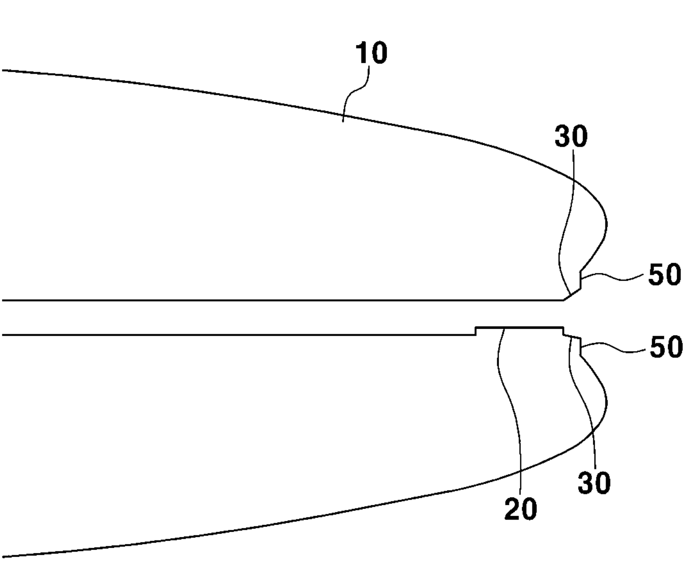
FIG. 8 shows a vertical surface of the air vent structure according to the present disclosure.

As shown in FIG. 8, according to an embodiment of the present disclosure, the passage 10 includes a vertical surface 50. The vertical surface 50 is provided at the outlet 14 side of the passage 10 and extends from the inclined surface 30. The vertical surface 50 is a straight section of a certain length, arranged downstream of the inclined surface 30 in the direction of the airflow. The vertical surface 50 is provided to prevent disturbing a desired discharge direction of the wind. The vertical surface 50 may have a size of at least 5 mm.

Figure 9:
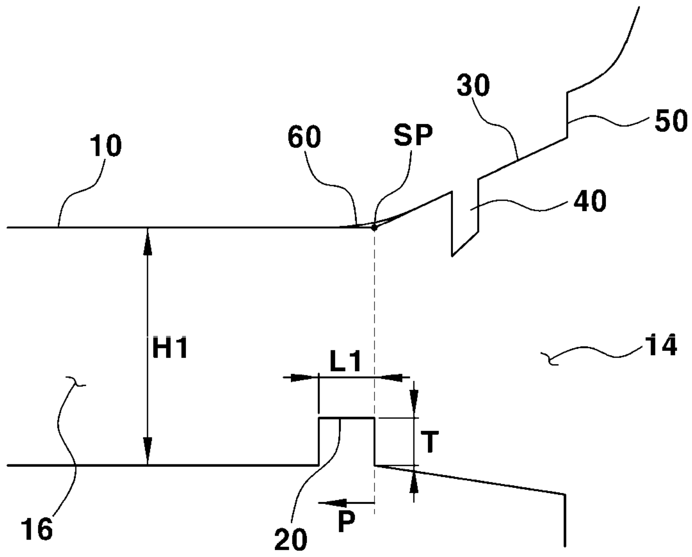
FIG. 9 shows a cross section of the air vent structure according to some exemplary embodiments of the present disclosure.

Further, the cross section of the air vent structure according to an embodiment of the present disclosure is shown in FIG. 9. Referring to FIG. 9, a fillet 60 with a certain radius may be applied to a starting point (SP) where the inclined surface 30 starts from the channel 16. That is, the fillet 60 may include a curved section in the channel 16 to connect an end of inclined surface 30.

According to the present disclosure, a wind direction control method using the Coanda effect is applied to the air vent by omitting the wings from the air vent, departing from the conventional wing method. Therefore, the height of the outlet or an opening portion of the air vent can be greatly reduced, thereby contributing to the improvement of the appearance.

Further, the present disclosure has a structure including the collection plate, the inclined surface, and the projection, and is superior to the conventional wing type having a greater flow resistance despite the slim opening portion, thereby easily securing an amount of the wind.

Further, the present disclosure provides the performance to control the wind direction with the simple structure.

The aforementioned present disclosure is not limited to the aforementioned exemplary embodiments and the accompanying drawings, and it will be apparent by those skilled in the art to which the present disclosure pertains that the present disclosure can be variously substituted, modified, and changed without departing from the technical spirit of the present disclosure.

What is claimed is:

1. An air vent structure comprising:

a collection plate disposed on a first side in a passage through which air flows, wherein the collection plate is fixedly positioned on the first side and protrudes from the first side to the passage;

an inclined surface disposed on a second side that is opposite to the first side, the inclined surface having an inclination; and a projection configured to be retractable from the inclined surface, wherein a tip of the projection is oblique, wherein a volume of the projection, protruding from the inclined surface, is configured to be adjustable.

2. The air vent structure of claim 1, wherein the collection plate is configured to reduce a size of an air flow path provided by the passage or a cross-sectional height of the air flow path provided by the passage.

3. The air vent structure of claim 1, wherein the collection plate is a flat plate extending horizontally in the passage.

4. The air vent structure of claim 1, wherein the inclined surface has an inclination such that a size of an air flow path provided by the passage or a cross-sectional height of an air flow path provided by the passage gradually increases towards an outlet of the passage.

5. The air vent structure of claim 1, wherein a height of the passage is 10 to 20 mm.

6. The air vent structure of claim 5, wherein a thickness of the collection plate is between 10 and 50% of the height of the passage.

7. The air vent structure of claim 5, wherein a length of the collection plate is 1 to 30 mm.

8. The air vent structure of claim 1, wherein the collection plate extends from a first location to a second location along the passage, the second location being downstream of the first location with respect to an air flow direction in the passage, and the second location being vertically aligned with a starting point of the inclined surface in the passage.

9. The air vent structure of claim 1, further comprising a fillet having a curved section connecting an end of the second side to the inclined surface.

10. The air vent structure of claim 1, wherein a vertical surface extends vertically from an end of the inclined surface.

11. The air vent structure of claim 1, wherein the tip has a slope in parallel with the inclination of the inclined surface.

12. The air vent structure of claim 1, wherein the tip of the projection is triangular.

13. The air vent structure of claim 1, wherein the collection plate and the inclined surface are provided near an outlet of the passage.

14. The air vent structure of claim 1, wherein the air is configured to flow toward the collection plate in the passage.

* * * * *